June 13, 1939.  F. C. WERNER  2,162,145
COOKY MACHINE MECHANISM
Filed April 20, 1938  4 Sheets-Sheet 1
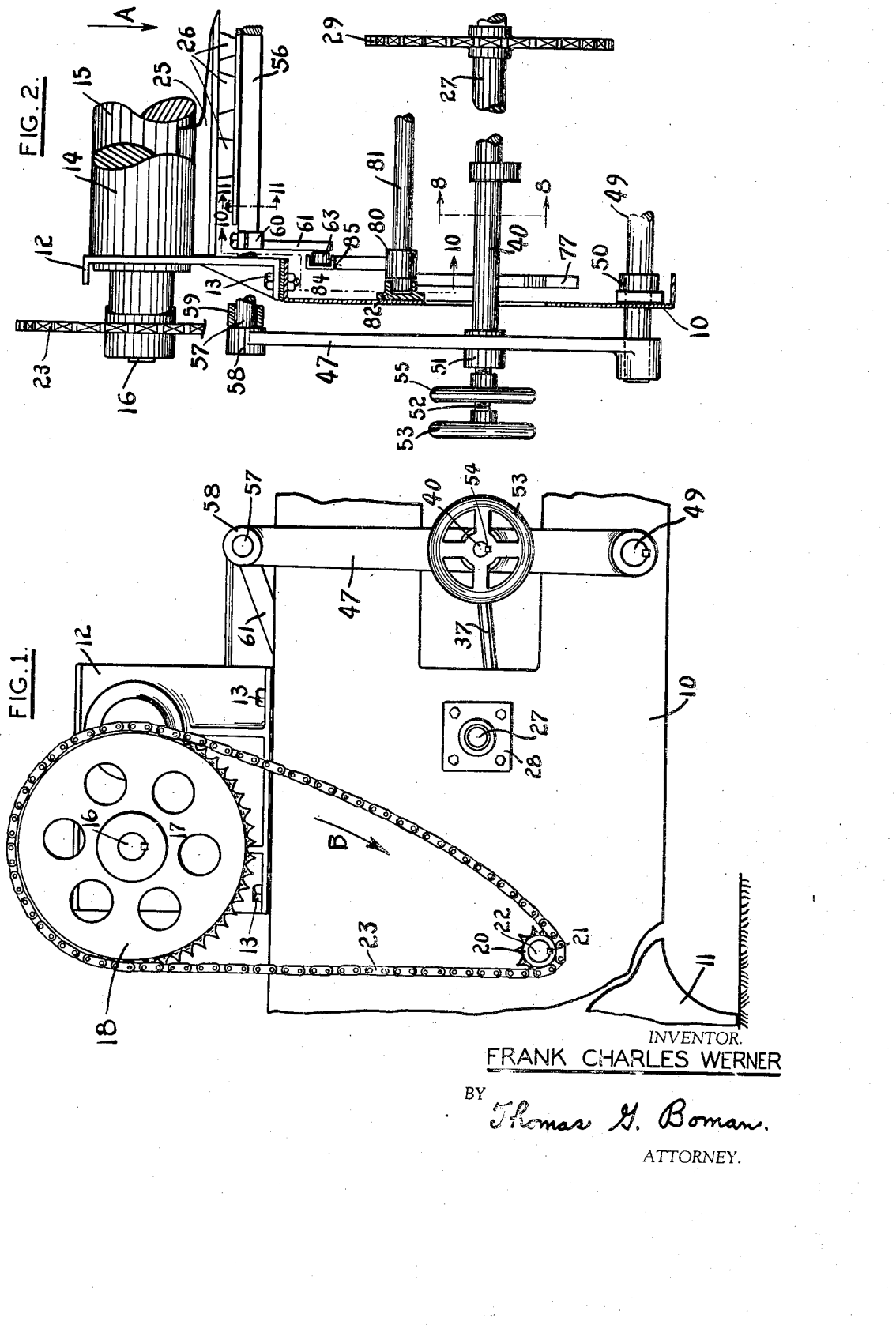
INVENTOR.
FRANK CHARLES WERNER
BY Thomas G. Boman.
ATTORNEY.

June 13, 1939.  F. C. WERNER  2,162,145
COOKY MACHINE MECHANISM
Filed April 20, 1938     4 Sheets-Sheet 2
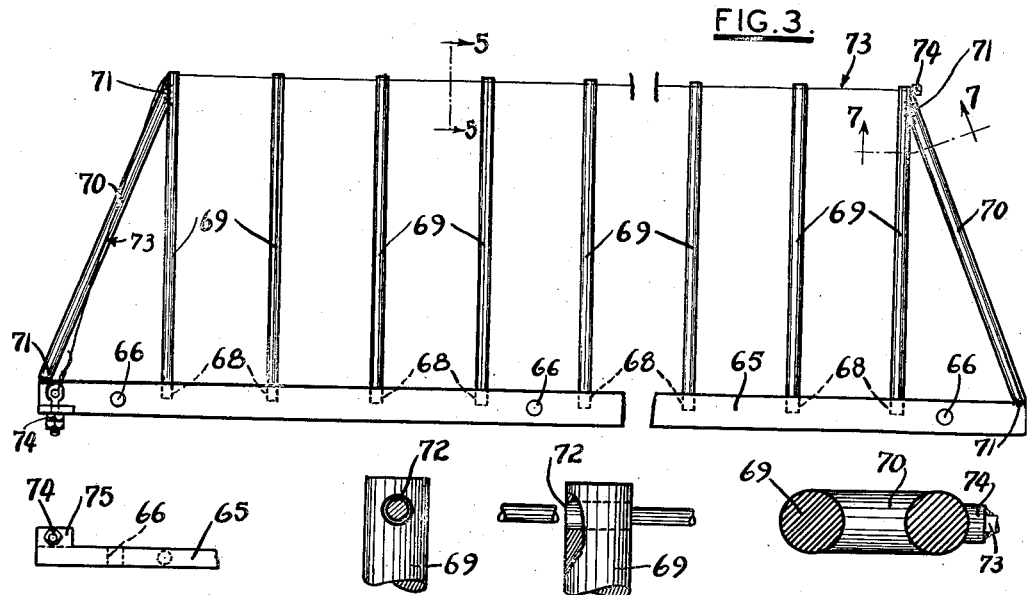
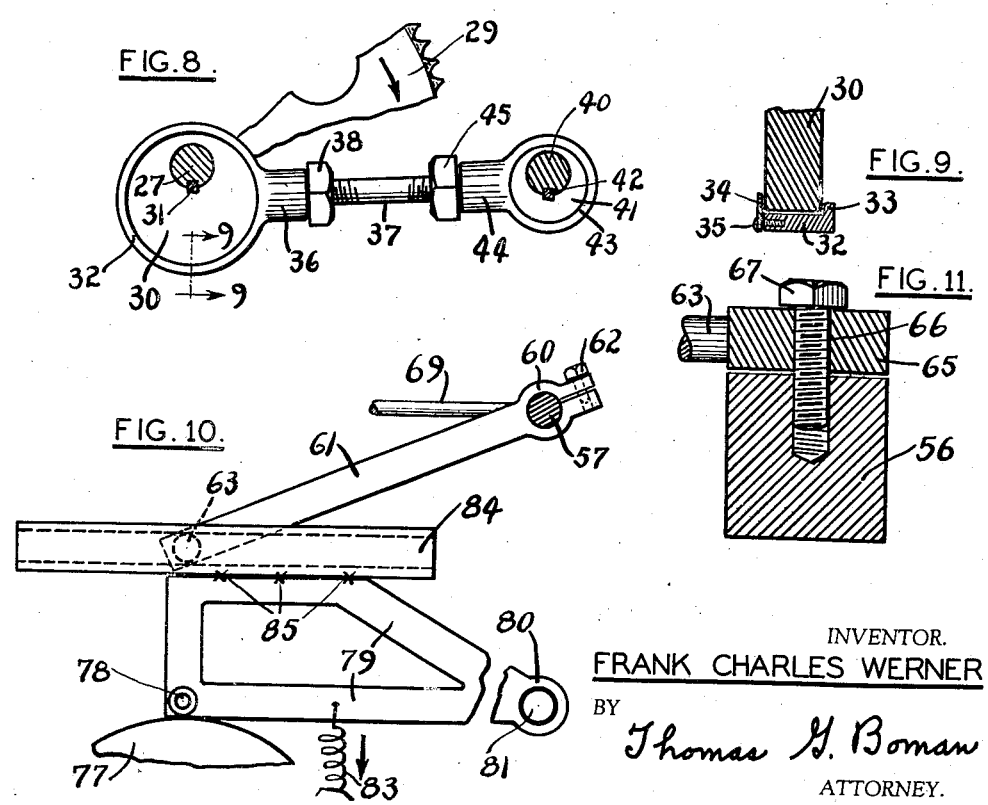
INVENTOR.
FRANK CHARLES WERNER
BY Thomas G. Boman
ATTORNEY.

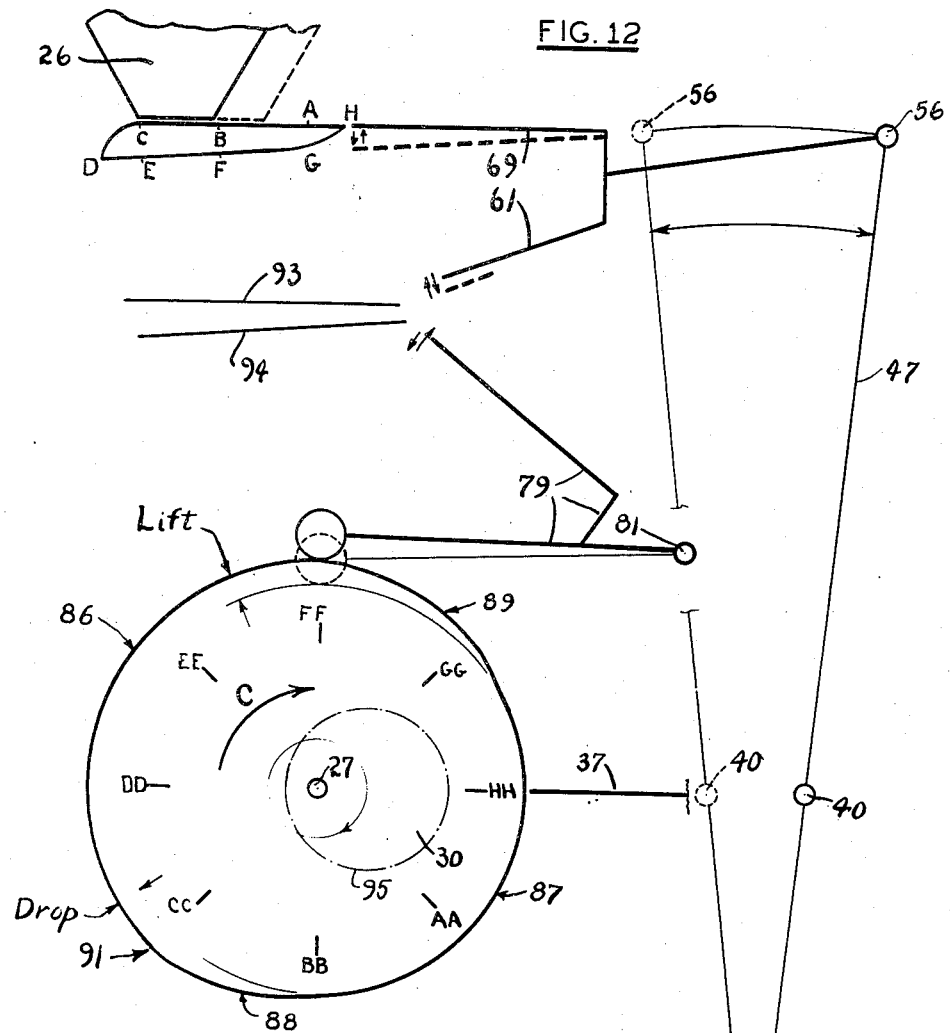
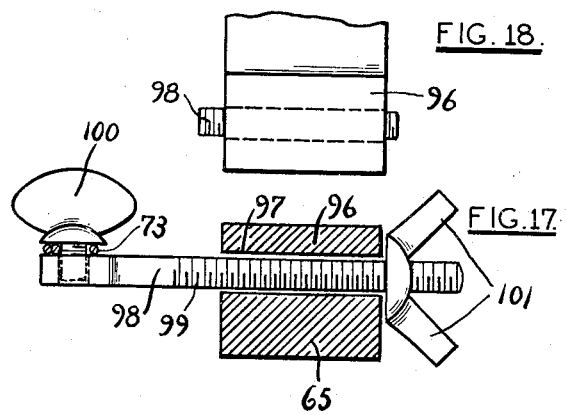

June 13, 1939.  F. C. WERNER  2,162,145
COOKY MACHINE MECHANISM
Filed April 20, 1938  4 Sheets—Sheet 4

INVENTOR.
FRANK CHARLES WERNER
BY Thomas G. Boman.
ATTORNEY.

Patented June 13, 1939

2,162,145

UNITED STATES PATENT OFFICE 2,162,145

COOKY MACHINE MECHANISM

Frank Charles Werner, Grand Rapids, Mich.

Application April 20, 1938, Serial No. 203,139

24 Claims. (Cl. 107—29)

This invention relates generally to a biscuit or cooky machine and more particularly to a machine which gives improved operation.

That is, my particular machine, as herein described, will operate in a better manner upon the several kinds of dough encountered. It will be appreciated, especially by those skilled in this art, that it is highly desirable, and almost necessary, in this age of extreme competition, to be able to use all kinds of dough, regardless of its consistency or plasticity and to furthermore use this dough as expediently as any kind of dough. That is to say, to use any and all kinds of dough within the desired range without gumming up the mechanism and without materially slowing down the speed.

My machine not only accomplishes the above recited advantages but also has an additional advantage in that it delivers ordinary dough to the pans of the conveyor at a very high rate of speed. This makes for economy in the manufacture of the machine inasmuch as the width of the machine can now be cut down. Previously, the speed of operation was considered as having attained a maximum and machines of greater capacity were obtained by increasing the width of the machine. In other words, more cookies were formed in a single operation. However, as will be understood, this greatly increased the cost of the machine, both initially and in upkeep. My improvements are such as to permit a speed of even 225 R. P. M. without having any difficulties in delivering the dough blanks.

My machine includes novel cutting mechanism, which will be understood as the description progresses, and also an advantageous result is obtained due to the particular path of the cutter together with its controlled speed. It will be understood that my cutter can be adjusted so as to start its downward travel, near the end of its stroke, immediately after it has passed through the dough and this downward component separates or aids in separating the cutter from the dough so as to minimize any flip thereto which might cause or tend to cause the cooky blank to turn over.

Another advantage lies in my adjustment whereby the path of the cutter can be bodily shifted so as to give the desired point at which the downward travel commences. This is needed when the size of the dough spouts are changed and also this adjustment may be utilized to take care of different kinds of dough. For instance, with an extremely tacky dough it is sometimes desirable to utilize this adjustment.

Yet another advantage resides in the specific members and their arrangement, these being so chosen as to give the desired functions in an optimum manner.

Still another advantage lies in my cutting off means, this being constructed in a manner whereby the entire assembly can be adjusted by the double manipulation at the ends thereof. Additionally, this adjustment is held by means of an extended arm carrying a roller riding in a track.

Still further objects or advantages will appear, or will suggest themselves, during the description of my mechanism.

The character of the invention may be best understood by reference to the following description of an illustrative embodiment thereof shown in the accompanying drawings, wherein:

Fig. 1 is a fragmentary side view of a machine embodying my invention.

Fig. 2 is an end elevation of Fig. 1.

Fig. 3 is an enlarged top view of my novel cutting device or mechanism, this view being taken as illustrated by the arrow A of Fig. 2.

Fig. 4 is a fragmentary end view at right angles to Fig. 3.

Fig. 5 is an enlarged sectional view taken along the line 5—5 of Fig. 3.

Fig. 6 is a view at right angles to Fig. 5.

Fig. 7 is an enlarged fragmentary sectional view taken along the line 7—7 of Fig. 3.

Fig. 8 is a view in section taken along the line 8—8 of Fig. 2.

Fig. 9 is a detail sectional view, this view being taken along the line 9—9 of Fig. 8.

Fig. 10 is a sectional view taken along the line 10—10 of Fig. 2.

Fig. 11 is a sectional view through the two bars which form the support for the cutting mechanism, this view being taken along the plane of the line 11—11 of Fig. 2.

Fig. 12 is a diagrammatic view illustrating one of the many paths of movement of the cutting wire and showing the movements of the several parts.

Figure 16:
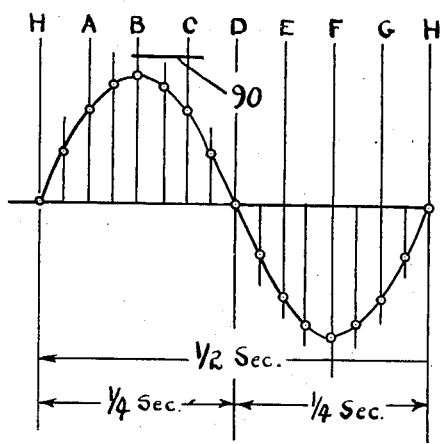

Fig. 16 graphically illustrates the speed of the cutter wire at its several points.

Fig. 17 is a view similar to Fig. 11 showing my preferred form of wire tautening means.

Fig. 18 is a top view of Fig. 17.

Similar numerals refer to similar parts throughout the several views.

Referring to Figs. 1 and 2, numeral 10 indicates a side frame which may have a foot 11 at either end thereof. It is to be understood that usually there are two side frames 10 provided, these carrying the several shafts therebetween. However, these frames are substantially duplicates except they are right and left hand respectively. Likewise, two of the roller supporting brackets 12 may be provided, these being bolted onto the side frames by bolts 13.

The bracket 12 revolubly carries one end of each of the ribbed or corrugated dough rollers 14 and 15, the roller 15 being extended by means of the shaft 16 to which is keyed at 17 the sprocket wheel 18. A drive pinion 20 is keyed at 21 onto the shaft 22, this shaft being driven at the desired speed by means of a prime mover, as, for example, an electric motor.

A sprocket chain 23 encircles the drive pinion 20 and the driven sprocket 18 to cause rotation of the roller 15 inwardly and downwardly with respect to the other roller 14. If desired, the roller 14 may be driven by the roller 15. Upon energization of the motor, the chain starts to drive in the direction indicated by the arrow B.

A sealing or closure structure 25, see Fig. 2, prevents the dough from being carried around by the rollers. Spouts or nozzles 26, located as shown, are provided for the flow or egress of the dough in a number of downwardly directed streams of continuous character. The cutting mechanism, to be presently described, cuts or slices these streams into blanks or wafers of the desired thickness.

A cross shaft 27 is revolubly mounted in a bearing box 28 at either end, this box being bolted to the side frame 10. See Fig. 1.

As shown in Fig. 2, the shaft 27 has a sprocket 29 fastened thereto and this sprocket may be driven in timed relationship with the pinion 20 previously referred to. In other words, there may be a reduction gearing between the driving motor and the pinion 20 and a change speed mechanism between the driving motor and the sprocket 29.

The shaft 27 also has a pair of eccentrics 30, see Fig. 8, keyed thereto at 31, and inasmuch as these sets are duplicates only one will be set forth. As shown in Figs. 8 and 9, the eccentric 30 is encircled by the band 32 flanged at 33 and having a plate 34 retained at the opposite edge by screws 35. The band has an integral neck 36 which threadedly receives the end of the rod 37 and a lock nut 38 locks these two members together.

A second shaft 40, see Figs. 1, 2 and 8, carries an eccentric portion 41 which is keyed thereto at 42. A band 43 encircles the portion 41 and merges into a boss or neck 44 which threadedly receives the other end of the rod 37. A lock nut 45 locks these members together. The threads at the ends of the rod 37 are right and left hand threads respectively.

Uprights or arms 47, one of which is shown in Fig. 2, are keyed at 48 to the cross shaft 49 which is rotatably received in bearings 50 fastened to the inner faces of the side frames 10. Thus these two uprights 47, carrying the cutting mechanism, move in exact symmetry.

Each of the uprights or arms 47, see Figs. 1 and 2, has an intermediate boss 51 formed thereon, this boss having a smooth cylindrical opening therethrough which receives the threaded and reduced end 52 of the shaft 40. It will be remembered that the shaft 40 carried the eccentric portions 41.

A handwheel 53 is keyed at 54 onto the reduced part 52 and thus the shaft 40 and the eccentric portions 41 can be rotated so as to, in effect, alter the center of the shaft 40 and thus change the path of oscillation of the uprights and consequently similarly change the path of the cutting mechanism.

A second handwheel 55 is threadedly mounted upon the reduced threaded portion 52 of the shaft 40 and rotation of this wheel against the boss 51 will lock the shaft 40 against any accidental rotation.

A shaft 56, see Figs. 2 and 11, is of square cross section medially and cylindrically shaped at its ends. These ends 57, see Fig. 2, are revolubly mounted in the enlarged upper ends 58 of the uprights 47. A spacer 59 is located adjacent the boss 58 and the upper end 60 of an arm 61 which is between the spacer 59 and the shoulder formed by the junction of the square shaft and the round shaft. A clamping bolt or stud 62, see Fig. 10, provides means for rigidly clamping the arm 61 onto the shaft 56 in any desired position. The arm 61 has roller antifriction means 63 located thereon at its other end.

The squared shaft 56 has the cutting frame rigidly fastened to its upper surface or guiding face. Thus the entire cutting edge is adjustable as a unit and moves as a unit. In other words, it is not necessary to individually adjust each particular cutting means for each of the several spouts or nozzles.

As shown in Figs. 3 and 11, an elongated bar 65 has three or more holes 66 bored therein as shown, these holes being threaded to receive cap screws 67. The square shaft 56, see Fig. 11, is likewise bored and threaded to receive the cap screws. Thus an extremely rigid connection is assured between the guiding face on the shaft and the guiding face on the bar.

The bar 65 is bored with a series of alined holes 68 along one edge to receive a series of fingers 69 therein, each finger being forced into the hole and also each finger may be welded if desired. Braces 70, see Fig. 3, are welded between the ends of the outer fingers and the ends of the bar 65 as at 71. As shown in Figs. 5 and 6, openings 72 are formed near the outer ends of the several fingers and these openings are located in exact alinement, as, for instance, by sighting therethrough, prior to the rigid attachment of the fingers. A cutting wire 73, collared at 74, is inserted through the several holes as shown, then extended along the brace 70, as shown, and fastened to the tensioning device 74 mounted upon the flange 75. Thus the wire may be tensioned to the desired degree.

Referring to Figs. 17 and 18, these views showing the desired form of my tightening mechanism, numeral 96 indicates a lug integrally formed on the bar 65. The lug 96 is bored with a square hole 97 to slidably receive the shaft or pin 98. The pin 98 is square in cross section so as to prevent any rotation thereof. It is threaded at its corners as indicated at 99. One end is enlarged and threaded to receive the winged set screw 100, the wire 73 being looped underneath as shown. A winged nut 101 completes the assembly. The other end of the wire is similarly fastened by another winged set screw 100 which threads directly into the bar 65 or an extension thereof. Of course there is no need for a second adjustment at the other end.

Again referring to the shaft 27, this shaft carrying the driving sprocket 29 and the pair of eccentrics 30, it is explained that this shaft also carries a pair of cams 77 keyed thereto. These cams are radial cams, and, as shown in Fig. 10, receive the follower roller 78, on the bell crank or frame 79, thereagainst. The frame 79 is pivoted at 80 onto the shaft 81 which extends between the bearings 82 mounted upon the inner faces of the side frames. The pivot 81 is preferably located so that the roller 78 will swing directly toward and away from the center of the cam thereby preventing any binding action between the roller and the cam. Each frame has a spring 83 pulling it in a direction to urge its follower into camming contact.

The frame 79 has a channel track 84 welded thereto at 85. This track receives the roller 63. See Figs. 2 and 10. As shown in Fig. 10, the roller 63 has an increased movement over the roller 78 when the cutting wire is at the outer portion of its travel. Fig. 12 shows an even greater increased leverage which is very desirable.

The cam may be of the shape shown in Fig. 12, that is, a high portion of constant diameter, indicated by numeral 86, a low portion 87, also of constant diameter, a descending or falling race 88 and a climbing race 89.

The race 88, in the particular embodiment shown, is approximately 45° in length inasmuch as this is necessary under the various assumptions to give the desired results. That is, the length of stroke of the cutting wire has been assumed to be 5 inches, the beginning of the drop is ¾ of an inch from the end of the cutting stroke and the amount of drop is ¾ of an inch. Fig. 12 is drawn to ⅜ of full size.

The throw of the eccentric, necessary to produce the desired stroke, is indicated by the circle 95.

The climbing race 89 is made considerably longer than the race 88 and this gives an easier action to the several parts. The length of the cam as shown is 66°. It is limited in length inasmuch as the cutter wire should not begin its sharper rise, caused by the cam part 89, until the wire 73 is past the spout so as to prevent any interference between the wire on its return stroke and the dough which is emerging from the spout.

The full line showing of Fig. 12 shows the eccentric and the uprights at their extreme right hand positions and the cutting wire 73 is at the position H. The roller 78 is located upon the high part of the cam and when in this position the track on the frame is in exact parallelism to a plane passing through the tips of the several spouts. In this instance the track is located in a horizontal plane.

Assume now that the shaft 27 rotates clockwise 45°, carrying with it the cam and the eccentric. The eccentric moves its crank point from HH to AA and of course the upright moves to the left the horizontal component of this distance. The top of the upright 47 moves to the left and likewise the cutting wire 73 moves from H to A.

The speed of the aforesaid movement increases from zero to about 7/10 of its maximum speed. This is graphically illustrated in Fig. 16.

The cam also rotates through 45° but its surface is a true circle and consequently the frame 79 does not rise or fall. Therefore, the arm 61, see Fig. 10, remains angularly fixed and this, in turn causes the cutting wire to travel exactly horizontally.

Next, assume an additional rotation of 45°. The maximum throw of the eccentric is now at BB and this causes the cutting wire to reach the point B, this point B being slightly past the halfway position. The speed of travel of the cutter is now at its maximum and this is desirable inasmuch as it is starting to cut through the dough. Reference to Fig. 16 will disclose the line 90, this line indicating the start, duration and finish of a particular cut. It will be understood that the desired speed can be utilized in making this cut.

The surface of the cam remains constant and thus the cutter travels in a horizontal plane.

Continued rotation of the shaft another 45° causes the maximum throw of the eccentric to arrive at CC and the cutter travels to C. The cam surface has not changed. However, after the cutter has reached the point C, it is desired to make it drop downwardly so as to tend to follow the dough blank and thus minimize its departure from the blank of dough. That is, to withdraw itself from the blank without flipping or turning it in any way to cause it to angularly fall to the pan. The several pans, not shown, are located about 1½ inches below the bottoms of the spouts. They are supported by a moving chain conveyor therebelow.

Corresponding to the point C is the point 91 on the cam. At this point the cam surface starts and continues until the cutter reaches the end of its stroke. This is point D on the cutter, point DD on the eccentric.

Next, the eccentric passes through the points EE, FF, and GG while the cutter passes through corresponding points E, F, and G. Shortly past FF the other race 89 is encountered by the roller or follower 78 and this causes the cutting wire to travel upwardly to the position H. This completes the cycle of the cutter.

It will be understood that the cutting wire 73 has harmonic motion due to the oscillation thereof by the uprights. However, the cam causes a vertical movement, at certain predetermined times, to be superimposed upon this harmonic motion thus causing the particular path above described to be followed.

It will be noted that the cutting wire begins its downward movement shortly after it has passed or cut through the dough. Oftentimes a different sized spout is used and in order that the downward movement of the cutting wire may be controlled the adjustment between the pitman 37 and the shaft 40 is provided. As previously explained, the handwheels 53 and 55 are used in making this adjustment.

The track 84 remains horizontal as long as the follower 78 rides upon the surface 86. When the follower starts downwardly the frame 79 tilts more and more until the track reaches the angle indicated by the line 94. Numeral 93 indicates the track's horizontal position. And, of course, the track assumes the several intermediate positions.

The speed of my cam may vary from 50 to 225 R. P. M. Assuming that it has a speed of 120 R. P. M. then it rotates 2 revolutions a second, or 1 revolution in ½ second. This is indicated in Fig. 16. Also, characters A to H, inclusive, represent positions similarly marked in Fig. 12. The graph in Fig. 16 does not show the downward drop of the cutting wire near the end of its stroke but this can be readily understood by reference to the closed path shown at the top of Fig. 12. The vertical distance between points C and D is the distance of travel due to the change in the cam. The sloping line between C and D is the actual path traveled. Actually, the drop may be ¾ inch. The speed of travel of the cutter can be understood by realizing that each interval, HA, AB, BC, etc., is equal in time.

Figure 13:
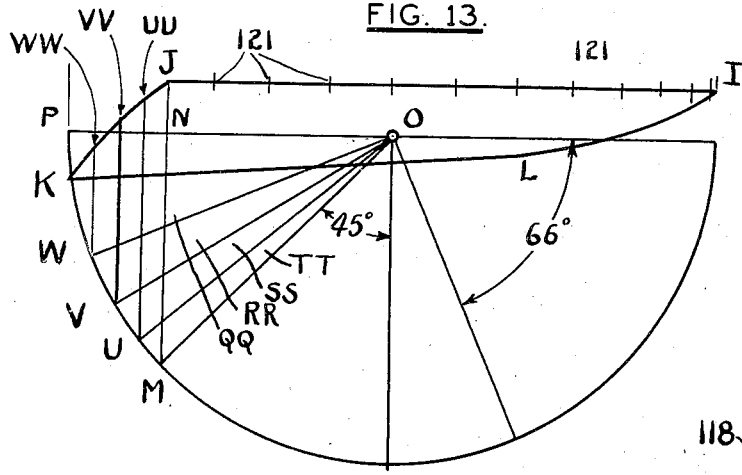
Fig. 13 illustrates a desirable path of movement for the cutter when operating upon many kinds of dough.
Figure 14:
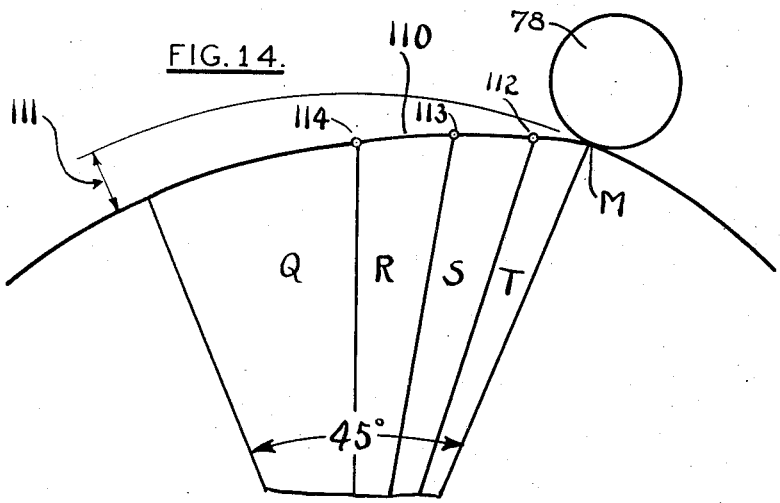
Fig. 14 illustrates the type of cam needed to cause the desired drop or downward swish at the end of the cutting stroke as shown in Fig. 13.

Fig. 13 is an enlarged view of a path IJKL in which the relative straightness of the inclined drop JK is obtained by the particular descending cam 110 shown in Fig. 14. The point O, halfway between points I and K, has been used as a center to strike the semi-circle therebelow, the radius being one-half of the stroke of the cutting wire. Actually the radius is 2½ inches and, as previously stated, the drop occurs ¾ of an inch before the end of the stroke. Therefore, NP is ¾ of an inch and the high point of the eccentric is along line OM. Computing by trigonometry, angle POM equals 45°. Thus the start of the drop on the cam is 45° prior to the end of the stroke and, since the drop terminates at the end of the stroke, the cam is 45° in length.

This is the angle subtended by the cam shown in Fig. 14. The cam, as shown, is divided into four divisions, each of these divisions being larger than the one to the immediate right thereof, but having an identical or equal drop. That is, Q is 22½°, R, S and T are progressively smaller. The line JK was arbitrarily made to be a straight line connecting these points and the space divided into 4 parts. The cutting wire must be at UU, by definition, and thus the point U, on the semi-circle, is its projection and the angle UOM is the angle of travel during which the drop is made. This drop is ¾ of an inch actually but is somewhat less on the cam inasmuch as the bell crank 79 gives an increased leverage. This increased leverage is very desirable and is to be considered a part of my invention.

Similarly, the next equal drop must occur during the travel through the angle VOU, Fig. 13, and this angle is shown by character S, Fig. 14. The next angle WOV in Fig. 13 is angle R in Fig. 14 while the largest angle POW in Fig. 13 is the angle Q in Fig. 14.

The total fall of the cam 110, see Fig. 14, is indicated by numeral 111 and the plotted points, 112, 113, and 114 show equal falls or increments along unequal angles.

Figure 15:
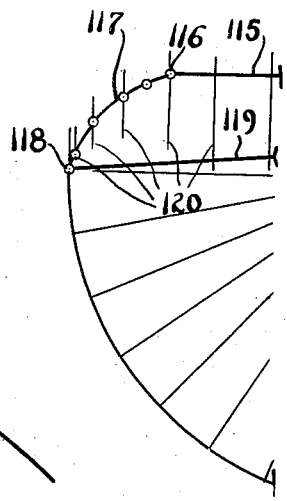
Fig. 15 shows a path which would be obtained by a cam of gradual and constant rise.

Fig. 15 is an enlarged view of the preferred form of path, this resulting from the use of the parabolic or crank type of cam. Or from the straight line curve type of cam. Numeral 115 designates the end of the straight path through which the cutter travels where it turns downwardly at 116. The drop 117 is along a curve as shown, this curve being a sine curve. It stops at 118 and returns at 119. It will be noted that the travel at 119 is along a slight upward angle which is desirable as it gives a more abrupt shock at 118 and a less abrupt shock at the other end of the cycle. This results from the use of my novel bell crank lever.

The vertical lines 120, divide the path into segments traveled in or during equal intervals of time, thus showing or disclosing the fact that the slowing down of the cutting wire, although still of harmonic motion, is nevertheless augmented by a component, namely, a vertical movement. In Fig. 13, numerals 121 likewise indicate equal time spaces.

The structure shown in Figs. 3 to 7, inclusive, represents the cutting mechanism. The fingers 69 are exactly alined and thus the cutting wire may be positioned between these fingers and tightened. Each finger is located between two adjacent nozzles. The wire may be slightly loosened, the machine being at such a position as to locate the wire centrally below the several spouts, then the entire frame pressed upwardly with the slightly loosened wire contacting the several spouts, then the stud 62 tightened. Next, the wire 73 is tautened by the tightener 74 and thus the wire, in actual operation is extremely efficient and gives a close cut.

There are additional advantages which will be apparent, especially to one skilled in this art, as the several claims are read and contemplated.

Although a particular embodiment of the invention has been illustrated and described in order to comply with the terms of the patent statutes, it is not intended that the invention shall be limited to said particular embodiment since the invention may be applied to other forms without departing from its spirit.

I claim:

1. In a machine of the class described, the combination of a frame, a downwardly facing spout, means for continuously forcing cooky dough or the like therefrom, second means for mounting the aforesaid means and the spout upon the said frame, a horizontal cross shaft located upon said frame, said shaft carrying an eccentric thereon, said shaft also carrying a cam thereon, the cam being a radial cam and having a low part for approximately one-half its circumference and a high part for approximately one-half of its circumference, a second horizontal cross shaft, an upstanding arm having its base pivotally mounted upon said second cross shaft, an eccentric portion located on said upstanding arm and being movable to different positions, means for locking the eccentric portion in a chosen position, a pitman connecting the said eccentric portion and the said eccentric, cutting means pivotally attached to the upstanding arm, said cutting means extending underneath the spout, a bracket pivoted to the frame laterally of said cam, means on said bracket engaging the surface of the cam, track means on said bracket, means cooperatively associated with said track means and said cutting means whereby they move simultaneously, said track means being horizontally positioned when said cam engaging means is in contact with the high part of the cam and means for mounting the radial cam and the eccentric so that the cutting means moves horizontally while it is in operation, and means for driving the first mentioned horizontal cross shaft.

2. In a machine of the class described, a frame, an upright member pivoted near the bottom of the frame, cutting means pivoted at the top of the upright member, a laterally extending shaft extending medially from the upright member, an eccentric thereon, means for adjusting the eccentric circumferentially of the said shaft, a cross shaft on said frame, means for driving the said cross shaft, an eccentric of predetermined size on said cross shaft, a radial cam also on said cross shaft, means connecting said eccentrics whereby rotation of the cross shaft causes oscillation of the upright member, a bell crank having one end pivoted laterally from the said cross shaft, means on the bell crank engaging said radial cam, a track located upon the bell crank and means associated with said track and said cutting means whereby the cutting means is controlled as desired.

3. A combination of elements as set forth in claim 2 in which the cam is so shaped as to cause speeding up of the cutting means near the ends of its stroke.

4. The combination with a dough spout having a downwardly facing opening, of dough severing means therebelow, means for moving the said severing means horizontally underneath the spout so that it moves with a harmonic motion, additional means for moving the severing means downwardly, and means for actuating the said additional means prior to the completion of the horizontal movement whereby the severing means travels downwardly at an angle away from the spout after it has passed therebelow.

5. The combination of elements as set forth in claim 4 in which the actuating means causes the downward movement to occur until the end of the stroke.

6. The combination of elements as set forth in claim 4 in which the actuating means operates to cause movement of the cutting or severing means downwardly at such a speed whereby the cutting or severing means will travel at approximately 45° with respect to the initial angle of travel.

7. In combination with a dough spout facing downwardly, a cutter therefor, means for driving the cutter across and underneath the spout, a radial cam, means for driving the cam in synchronism with the cutter, said cam making one revolution during each cycle of the cutter, said cam having a high circular portion and a low circular portion, races therebetween and means riding the cam and associated with the cutter for partially controlling the movement of the same, said means amplifying the movement of the cutter during at least a portion of its cycle.

8. In combination with a dough spout facing downwardly, a cutter therefor, means for driving the cutter across the tip of the spout, then downwardly and forwardly, then rearwardly and upwardly at a slight angle and then upwardly at a sharper angle to the point of its commencement.

9. In combination with a dough spout facing downwardly, a cutter therefor, means for driving the cutter across and underneath the spout, said spout being relatively small with respect to the length of the travel strokes of the cutter, additional means for driving the cutter upwardly and downwardly, means for actuating the above means whereby the cutter will be driven downwardly and forwardly, then rearwardly and then upwardly to the point of its commencement, the start of said upward movement being laterally located with respect to the prolongation of the spout.

10. In combination, a shaft, driving means therefor, a cam and an eccentric upon said shaft, both being fixed thereto, an upright pivoted adjacent to said shaft, eccentric means rotatably mounted on the upright, locking means located between the said eccentric means and the upright, a connecting rod attached to the eccentric, means connecting the rod and the eccentric means, above its pivot, whereby the upright is oscillated, a cutter pivoted onto the upright, a pivoted bell crank, a roller thereon contacting said cam, said cam having a high portion and a low portion, and means extending between the bell crank and the cutter whereby they move together and spring means for holding the bell crank against the said cam.

11. In a cooky machine having a series of downwardly facing spouts for egressing dough and oscillating means adjacent thereto, the combination of, a bar fastened to said oscillating means, said bar having a flat surface, means for adjusting and holding the bar against rotation, a second bar having a series of alined and perforated rods permanently attached thereto in alinement, a wire extending through the several perforations, means for tightening the said wire and means for attaching the second bar onto the first bar against the flat surface thereof.

12. In combination, a frame, a cross shaft therein, two spaced uprights pivoted near their lower ends upon the said cross shaft, means for oscillating the uprights, a second cross shaft revolubly mounted near the upper ends of the uprights, an elongated member, rigid cutting means fastened rigidly and permanently onto the elongated member, connecting means for removably fastening the elongated member onto the second cross shaft, an arm adjustably fastened onto the said second shaft and extending away therefrom, guiding means on the end of the arm, cam means for guiding the guiding means whereby the path of the cutting means is determined.

13. In a machine of the class described, a frame, a shaft therethrough, spaced uprights mounted at their lower ends upon the said shaft, cutting means at their upper ends, a second shaft extending through the uprights, an eccentric thereon, a handwheel rigidly attached to the second shaft, said shaft being threaded adjacent one of said uprights, a second hand-wheel rotating on said threaded part, and means encircling said eccentric to oscillate said uprights.

14. In combination with a dough dropping spout, a cutter therebelow, means for moving this cutter back and forth below the spout in a horizontal direction, additional means for adding a vertical movement to the cutter and actuating means for operating the additional means prior to the completion of the cutting stroke, said actuating means ceasing its operation simultaneously with the start of the return movement of the cutter.

15. In combination with a dough dropping spout, a cutter therebelow, means for moving this cutter back and forth below the spout in a horizontal direction, additional means for adding a vertical movement to the cutter and actuating means for operating the additional means prior to the completion of the return stroke, said actuating means ceasing its operation simultaneously with the start of the cutting movement of the cutter.

16. A combination of elements as recited in claim 15 in which the actuating means also operates the additional means prior to the completion of the cutting stroke and ceases its operation simultaneously with the start of the return movement of the cutter.

17. In combination with a dough spout facing downwardly, a cutter therefor, means for driving the cutter across the tip of the spout, then downwardly and forwardly, then rearwardly and then upwardly to the point of its commencement.

18. In combination with a dough spout facing downwardly, a cutter therefor, means for driving the cutter across the tip of the spout, then downwardly and forwardly, and then rearwardly and upwardly to the point of its commencement.

19. In a machine of the class described, a frame, a shaft therethrough, spaced uprights mounted at their lower ends upon the said shaft, cutting means at their upper ends, a second shaft extending through the uprights, an eccentric thereon, operating means rigidly attached to the second shaft, said shaft being threaded, locking means rotating on the threaded part and associated with one of the uprights, and means encircling said eccentric to oscillate the uprights.

20. In combination, a frame, a cross shaft therein, two spaced uprights pivoted near their lower ends upon the said cross shaft, means for oscillating the uprights, a second cross shaft revolubly mounted near the upper ends of the uprights, means for controlling the second cross shaft as regards its turning movement, said second cross shaft having a series of locking means thereon along its length, unit frames including an elongated base and rigid permanently attached fingers extending therefrom, a second series of locking means along its length so spaced as to be adjacently and cooperatively associated with the first series of locking means whereby the unit frame may be removed and replaced as desired without disturbing the adjustment between the base and its several fingers.

21. A combination of elements as set forth in claim 20 in which the control means comprises a plurality of separate means located axially along the shaft.

22. In combination, a frame, a cross shaft therein, two spaced uprights pivoted near their lower ends upon the said cross shaft, means for oscillating the uprights, a second cross shaft revolubly mounted near the upper ends of the uprights, means for controlling the second cross shaft as regards its turning movement, said second cross shaft having an elongated guiding face thereon, a unit frame having a second guiding face associated with the first face, and locking means for holding the said faces together and also holding the unit frame against longitudinal movement along the cross shaft for the purpose described.

23. In a cooky machine having a series of downwardly facing spouts for egressing dough and oscillating means adjacent thereto, the combination of, a bar fastened to said oscillating means, said bar having alining means thereon, means for holding the bar against rotation, a second bar having a plurality of predeterminedly positioned rods permanently attached thereto, cutting means associated with the plurality of said rods, and means for attaching the second bar onto the first bar by means of the said alining means.

24. In combination, a frame, a cross shaft therein, two spaced uprights pivoted near their lower ends upon the said cross shaft, means for oscillating the uprights, a second cross shaft revolubly mounted near the upper ends of the uprights, means for controlling the second cross shaft as regards its turning movement, said second cross shaft having a guiding face thereon, a unit frame having a second guiding face associated with the first face and means for holding the said faces together.

FRANK CHARLES WERNER.